(12) United States Patent
Eisele et al.

(10) Patent No.: US 9,676,565 B2
(45) Date of Patent: Jun. 13, 2017

(54) VACUUM GRIPPING DEVICE

(71) Applicant: J. Schmalz GmbH, Glatten (DE)

(72) Inventors: Thomas Eisele, Alpirsbach-Peterzell (DE); Rainer Höhn, Dornstetten (DE); Walter Dunkmann, Baden-Baden (DE)

(73) Assignee: J. Schmalz GmbH, Glatten (DE)

( * ) Notice: Subject to any disclaimer, the term of this patent is extended or adjusted under 35 U.S.C. 154(b) by 0 days.

(21) Appl. No.: 14/900,577

(22) PCT Filed: Sep. 16, 2014

(86) PCT No.: PCT/EP2014/069706
§ 371 (c)(1),
(2) Date: Dec. 21, 2015

(87) PCT Pub. No.: WO2015/062777
PCT Pub. Date: May 7, 2015

(65) Prior Publication Data
US 2016/0236876 A1 Aug. 18, 2016

(30) Foreign Application Priority Data
Nov. 4, 2013 (DE) .................. 10 2013 222 377

(51) Int. Cl.
B65G 47/91 (2006.01)
(52) U.S. Cl.
CPC ............ *B65G 47/91* (2013.01); *B65G 47/918* (2013.01)
(58) Field of Classification Search
CPC ............................... B65G 47/91; B65G 47/918
See application file for complete search history.

(56) References Cited

U.S. PATENT DOCUMENTS 2,980,183 A * 4/1961 Wells .................. D21J 7/00
162/402
5,374,021 A 12/1994 Kleinman
(Continued)

FOREIGN PATENT DOCUMENTS

CN 1676288 A 10/2005
CN 102161436 A 8/2011
(Continued)

OTHER PUBLICATIONS

Examination Report dated Aug. 6, 2014 issued in German Patent Application No. 10 2013 222 377.3.
(Continued)

*Primary Examiner* — Gerald McClain
*Assistant Examiner* — Ronald Jarrett
(74) *Attorney, Agent, or Firm* — Howard & Howard Attorneys PLLC

(57) ABSTRACT

A vacuum gripping device comprising a plurality of suction bodies, each comprising a suction chamber for applying to a workpiece to be gripped, a suction valve is associated with each suction point, wherein each suction valve comprises a vacuum supply side for connection to a vacuum supply device and a suction side connected to the suction chamber of the assigned suction body, wherein the suction valve comprises a valve body, moveable between an open position and a closed position, wherein the valve body is arranged on a flexible control membrane which delimits a control chamber; in such a way that the valve body is moveable from the open position into the closed position using deformation of the control membrane, and wherein a membrane cloth extending across multiple or all suction points is arranged in the gripper housing.

12 Claims, 6 Drawing Sheets

(56) References Cited

U.S. PATENT DOCUMENTS

| | | | |
|---|---|---|---|
| 6,095,506 A | 8/2000 | Schmalz et al. | |
| 8,070,156 B2 | 12/2011 | Yoda et al. | |
| 2015/0224784 A1* | 8/2015 | Hong | B41J 2/16535 347/47 |

FOREIGN PATENT DOCUMENTS

| | | |
|---|---|---|
| DE | 39 06 634 A1 | 9/1990 |
| DE | 42 26 822 A1 | 2/1994 |
| DE | 690 08 874 T2 | 11/1994 |
| DE | 198 14 262 A1 | 10/1999 |
| FR | 2 561 221 A1 | 9/1985 |
| SU | 552270 A1 | 3/1977 |
| WO | 83/04384 A1 | 12/1983 |

OTHER PUBLICATIONS

Official Report dated Jan. 18, 2016 issued in Chinese Patent Application No. 201480004288.8.
International Search Report mailed Jan. 20, 2015 for PCT International Application No. PCT/EP2014/069706.
Written Opinion of the International Searching Authority mailed Jan. 20, 2015 for PCT International Application No. PCT/EP2014/069706.

* cited by examiner

VACUUM GRIPPING DEVICE

CROSS-REFERENCE TO RELATED APPLICATIONS

The present application is a National Phase of International Patent Application No. PCT/EP2014/069706, filed on Sep. 16, 2014, which claims priority to and all the benefits of German Patent Application No. 10 2013 222 377.3, filed on Nov. 4, 2013, both of which are hereby expressly incorporated herein by reference in their entirety.

BACKGROUND OF THE INVENTION

1. Field of the Invention

The invention relates to a vacuum gripping device, in particular a surface vacuum gripper.

2. Description of the Related Art

Vacuum gripping devices are usually equipped with a plurality of suction bodies disposed adjacent to one another at suction points of a working surface of a gripper housing. The suction bodies are each designed to apply a suction to a workpiece that is to be gripped. With vacuum gripping devices of this type, a suction valve is allocated to each suction element. A vacuum gripping device having features of this type is described in DE 690 08 874 T2.

Those suction valves, in particular, which close automatically when the suction point is unoccupied, and thus prevent an undesired leakage from the suction side of the valve to the vacuum supply side, are suited for this. A valve of this type is disclosed, for example, in DE 198 14 262 C2. This valve has a valve body, which is disposed on a flexible, wall-like section that delimits a control chamber of the valve. The control chamber is connected to the vacuum supply side. The pressure of the suction side of the valve bears on the other side of the wall-like section. The control chamber, however, is closed off from the suction side, in terms of flow, by the wall-like section. When the control chamber is compressed, the flexible section is deformed, such that the valve body is moved to its closed position. If a suction occurs in the unoccupied state of the suction side, then no appreciable vacuum is obtained at the suction side. As a result, the control chamber is compromised, due to the static pressure difference between the control chamber and the suction side, and thus the valve body is brought into its closed position. The valve thus closes automatically when the suction side is unoccupied. Such valves have a complex structure and must be adjusted to the properties of the suction device that is to be controlled pertaining to flow technology, in particular in order to adjust the response sensitivity of the automatic closing. The integration of such valves in a vacuum gripping device is thus associated with structural challenges.

Other types of vacuum gripping devices are described in U.S. Pat. Nos 8,070,156 B2, 5,374,021 A, FR 2 561 221 A1 and WO 83/04384 A1. These, however, do not have any suction bodies allocated to the suction points. Instead, these vacuum gripping devices have a flat terminal suction plate that is to be placed on the workpiece that is to be gripped.

SUMMARY OF THE INVENTION

The invention addresses the object of providing a vacuum gripping device having integrated suction valves for the suction elements, wherein the suction valves can be adjusted to the individual suction elements during the manufacture thereof, and wherein a reliable and economical production and assembly thereof is enabled.

This object is achieved by a vacuum gripping device, having a plurality of suction bodies, which are disposed at suction points of a working surface of a gripper housing. Each suction point is allocated one suction valve integrated in the gripper housing thereby. Each suction valve has a vacuum supply side having a suction connection for connecting to a vacuum supply device, and a suction side connected to the suction chamber of the suction body allocated thereto. The suction side of the actual valve can have a suction opening that communicates with the suction chamber. Each suction valve has a valve body that can move between an open position and a closed position, wherein the flow connection between the suction side and the vacuum supply side is interrupted when in the closed position, and a suctioning from the suction side through the suction valve to the vacuum supply side is enabled when in the open position. The valve body is disposed on a flexible control membrane, which delimits a control chamber in the gripper housing. As a result, the valve body can move from the open position to the closed position, depending on a vacuum that can be obtained in the control chamber by deforming the flexible control membrane. The control membranes of most or all of the suction valves are formed by control sections of a membrane sheet, which extends in the gripper housing over most or all of the suction points.

The valve bodies for the various suction valves are disposed at the control sections of the membrane sheet. Because the membrane sheet extends over numerous suction points, and provides the control membranes for the respective suction valves, it can be installed in a convenient manner and integrated in the gripper housing for the function of a substantial portion of the assembly. The response behavior of the suction valve is affected by, among other things, the properties of the control membrane, in particular by its tensioning and flexibility. The use of a shared membrane sheet thus makes it possible to provide, as needed, numerous suction valves having the desired properties; in particular, it is possible to provide a large number of identical suction valves in the vacuum gripping device.

In order to simplify the assembly, the gripper housing can have a multi-part construction, and in particular, can comprise a housing upper part, and a housing lower part having the working surface. The membrane sheet can then be disposed between the housing upper part and the housing lower part, and in particular, it can be clamped between the housing upper part and the housing lower part during the assembly.

A valve accommodating chamber is formed in the gripper housing, in particular for each suction point, which chamber extends away from the working surface along a valve longitudinal direction. The membrane sheet stretches across the valve accommodating chamber thereby. The section of the membrane sheet passing through the valve accommodating chamber forms the control section and thus the control membrane for the respective valve. Preferably, the membrane sheet extends parallel to the working surface. The membrane sheet is preferably secured in the valve accommodating chamber along an edge encompassing the control section. The valve accommodating chamber is preferably a cylindrical opening in a housing section spaced apart from the working surface, e.g. the aforementioned housing upper part. The valve bodies are preferably designed such that they each extend into the valve accommodating chamber. When the membrane sheet is clamped between the housing upper part and the housing lower part, then the control chambers of the suction valves delimited by the control membranes each extend into the housing upper part.

In order to adjust the switching properties of the valve, the membrane sheet is attached, in particular in a tensioned manner, in the valve accommodating chamber, such that the valve body is tensioned in the open position against a movement toward the closed position. For this, the valve body is disposed at the respective control section, in particular at a spacing to the encompassing edge, preferably in the center thereof.

The valve bodies of the various suction valves can be designed as an integral part of the respective control sections of the membrane sheet, thus enabling a simple production of this essential component of the suction valve.

The membrane sheet can have a different thickness and/or different flexibility in at least two different suction points, in order to design the response sensitivity and closing time of various suction valves differently. As such, the suction valve of a suction element at the edge of the vacuum gripping device can be set differently than the suction valve for the central suction element.

The suction bodies at the various suction points are preferably each disposed flush with the allocated valve bodies on the working surface. The suction bodies can be movably coupled thereby to the allocated control sections and/or the allocated valve bodies of the respective activating suction valve (e.g. mechanically connected), such that when the valve body moves from the open position to the closed position, the respective suction body is moved from an advanced suction position to a retracted passive position. If the allocated suction valve switches to the closed position, then the respective suction body is retracted to its passive position. As a result, it is possible to prevent such suction elements that bear on a workpiece that is to be gripped at the edges thereof, such that they are not entirely resting thereon in a sealed manner, from pushing the gripped workpiece away from the working surface of the vacuum gripping device, against the suction of the other suction elements, due to their elasticity.

The suction valves are preferably valves of the type that close automatically, when drawing freely with an unoccupied suction side, in order to avoid undesired leakage. This can be implemented in a variety of ways with suction valves of the type described.

By way of example, the valve body can have a sealing section, which closes a suction passage when in the closed position, which passage connects the control chamber to the vacuum supply side of the respective suction valve, and in the open position, leaves the suction passage open. This valve body has a suction side passage having a choke point, which establishes a flow connection of the suction side to the control chamber when the valve is in the open position. In the open position, the vacuum provided by the vacuum supply is thus present in the respective control chamber, and this vacuum acts on a compression of the control chamber. Air suctioned from the suction side flows through the suction side passage into the control chamber, wherein this flow is limited by the choke point. If the suction side is unoccupied, then the comparatively large flow over the choke point leads to a pressure difference and thus to a pressure deficit in the control chamber in relation to the suction side. If this pressure difference reaches a predetermined, or pre-determinable value, then this difference leads to a compression of the control chamber by a deformation of the respective control membrane, and thus to a movement of the valve piston into its closed position. The sealing section bearing on an allocated seal seat then closes the suction passage. Due to the vacuum present at the vacuum supply side, the sealing section is retained in the closed position and the valve remains closed.

A suction valve that closes automatically can also be realized in that the valve body has a suction side passage having a choke point for establishing a flow connection of the control chamber to the suction side, and furthermore has a sealing section, which bears against a seal seat allocated thereto, when in the closed position, wherein the sealing section and the seal seat are disposed such that, when in the closed position, the flow connection is already closed in a sealed manner, starting from the suction side, through the suction side passage. The control chamber is connected here, in particular constantly (both in the open position as well as in the closed position), to the vacuum supply side. The seal seat and the sealing section are preferably disposed outside the control chamber. As a result, the volume of the control chamber can be kept small, which leads to short response times of the valve. In the open position, the air suctioned in at the suction side flows through the suction side passage into the control chamber. If the suction side is unoccupied, the large flow results in a pressure difference, via the flow resistance of the choke point, and thus to a pressure deficit in the control chamber in relation to the suction side, wherein the valve piston is guided into its closed position, by deforming the control membrane to reduce the volume of the control chamber occurs. In this closed position, the sealing section bears on the allocated seal seat, and is suctioned securely thereto.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

The same reference symbols are used for identical features, or features corresponding to one another in the following description as well as in the Figures.

Figure 1:
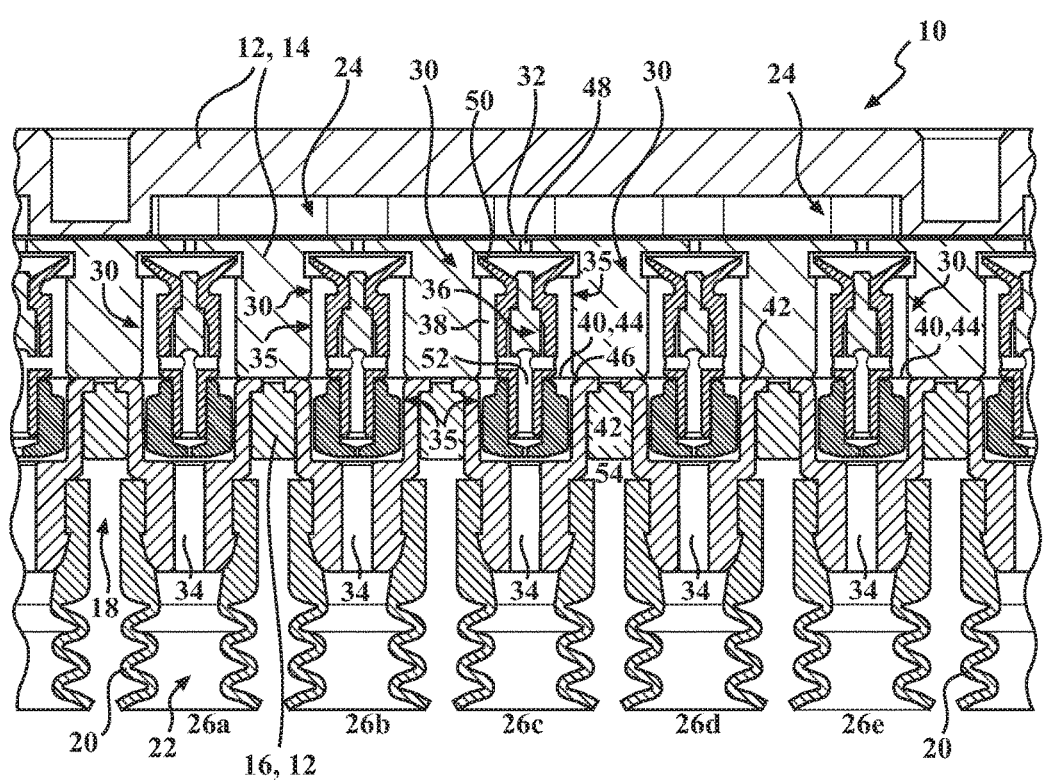
FIG. 1 is a sectional view of a surface vacuum gripper according to the invention.

FIG. 1 shows a section of a surface vacuum gripper 10, in a sectional view. The surface vacuum gripper has a gripper housing 12, having a multi-part construction, and having a housing upper part 14 and a housing lower part 16. The housing lower part 16 has a (planar, for example) working surface 18, which faces a workpiece that extends in a planar manner, for example, for the handling thereof. Numerous suction bodies 20 are disposed on the working surface 18, which extend over the working surface 18 such that they can be brought to bear on a workpiece that is to be gripped. Each suction body 20 delimits a suction chamber 22, which is open in a suctioning direction, and bears against a workpiece in a sealed manner in order to adhere thereto by suction.

Vacuum supply channels 24 are formed in the gripper housing 12, in this case, concretely, in the housing upper part 14, which are connected to a vacuum supply device, through which air or some other fluid can be evacuated from the vacuum supply channels 24.

The suction bodies 20 each define suction points 26a to 26e of the surface vacuum gripper 10. One suction valve 30, integrated in the gripper housing 12, is allocated to each suction point 26a to 26e, wherein, in the exemplary depiction in FIG. 1, the construction of the numerous suction valves 30 is identical. Each suction valve 30 has one vacuum supply side 32 having one suction connection, which is connected to the vacuum supply channels 24. On the other hand, each suction valve 30 has a suction side 34 connected to the suction chamber 22 of the respective suction point 26a to 26e, having a suction opening that is open toward the suction chamber 22.

Each suction valve comprises a valve accommodating chamber 35, extending along a valve longitudinal direction, away from the working surface 18, in which, in each case, a valve body 36 can be displaced along the valve longitudinal direction. The valve body 36 can be displaced between a closed position and an open position (which is depicted in FIG. 1). When in the closed position, the valve body closes the flow connection between the suction side 34 and the vacuum supply side 32 of the respective suction valve 30. In the open position, the flow connection is opened, such that air can be suctioned from the suction side 34 through the respective suction valve 30 to the vacuum supply side 32.

The movement of the valve body 36 between the open position and the closed position is controlled thereby by the pressure in a control chamber 38. The control chamber 38 is delimited in the gripper housing 12 for each suction valve 30 by a control membrane 40, which stretches across the respective valve accommodating chamber 35.

The valve body 36 is disposed thereby on the control membrane 40, such that, with the movement of the valve body 36 from the open position shown in FIG. 1 into the closed position, the control membrane 40 is deformed (more precisely: it is caused to bulge toward the vacuum supply side 32), and as a result, the volume of the control chamber 38 is reduced. The valve piston 36 is thus moved into its closed position when there is a pressure deficit in the control chamber 38 in relation to the pressure prevailing on the other side of the control membrane 40.

The control membranes 40 of the suction valves 30 at the suction points 26a to 26e are formed by the membrane sheet 42 extending over the suction points 26a to 26e disposed in the gripper housing 12. The control membranes 40 are each formed by control sections of the membrane sheet 42. The membrane sheet 42 is clamped, in particular, between the housing upper part 14 and the housing lower part 16, such that it extends substantially parallel to the working surface 18, in each case through the valve accommodating chambers 35 of the suction valves 30. The membrane sheet 42 delimits, in each case, the control chamber 38 of the respective suction valve 30 thereby, with its respective control section 44 in the housing upper part 14. Preferably, the membrane sheet 42 is secured thereby, in each case, in the valve accommodating chamber 35 along an encompassing edge 46.

A tensioning force for a movement of the valve body 36 from its open position to the closed position can thus be defined by the tension of the membrane sheet 42, and in particular the tension of the respective control section 44 within the encompassing edge 46.

The suction valves 30 depicted in FIG. 1 are designed such that they switch to the closed position when suctioning freely with unoccupied suction points 26a to 26e. In FIG. 1, the control chamber 38 of each suction valve 30 is connected to the vacuum supply side 32 and thus to the vacuum supply channels 24 via a suction passage 48. The valve bodies 36 each have a sealing section 50. This sealing section is disposed in the control chamber 38, and is designed such that the sealing section 50 covers the suction passage 48 when in the closed position, such that there is no flow connection from the vacuum supply side 32 to the respective control chamber 38.

The valve body 36 has, furthermore, a suction side passage 52 having a choke point 54. The suction side passage 52 opens into the control chamber 38 on one hand, and, at the suction side 54, via the choke point, on the other hand. In this respect, the suction side passage 52 establishes a connection from the control chamber 38 through the control membrane 40 to the suction side 34. Due to the choke point 54, the flow from the suction side 34 into the control chamber 38 is limited. A flow resistance is provided by the choke point 54 for the flow through the suction side passage 52. If the suction point 26a to 26e for one of the suction valves 30 is unoccupied (free suctioning), due to the relatively large flow via the choke point 54, then there is a pressure deficit in the control chamber 38, suctioned off by the suction passage 48, in relation to the suction side 34. As a result, the valve body 36 is moved into its closed position against a tension force applied by the control membrane 40. The sealing section 50 ends up in a sealing bearing against the suction passage 48, and is securely suctioned thereto.

If the respective suction point 26a to 26e is occupied, however, by a workpiece, not shown in FIG. 1, then the suction chamber 22 of the respective suction element 20 is evacuated, and no appreciable flow can occur via the choke point 54, and thus, no sufficient vacuum can be built up in the control chamber 38. The valve body 36 then remains in its open position, as depicted in FIG. 1.

In order to assemble the surface vacuum gripper 10, the valve bodies 36 can be attached to the respective control sections 44 of the membrane sheet 42. By way of example, the valve bodies can extend through the membrane sheet 42 and be bonded thereto with an adhesive. An integral design of the valve bodies and membrane sheet is also possible. The unit comprising a membrane sheet 42 and valve bodies 36 can then be placed in the housing upper part 14, for example, such that the valve bodies 36 engage in the valve accommodating chambers 35 at their sealing sections 50. The housing lower part 16 can be placed thereon, such that the membrane sheet 42 is clamped between the housing upper part 14 and the housing lower part 16.

Figure 2:
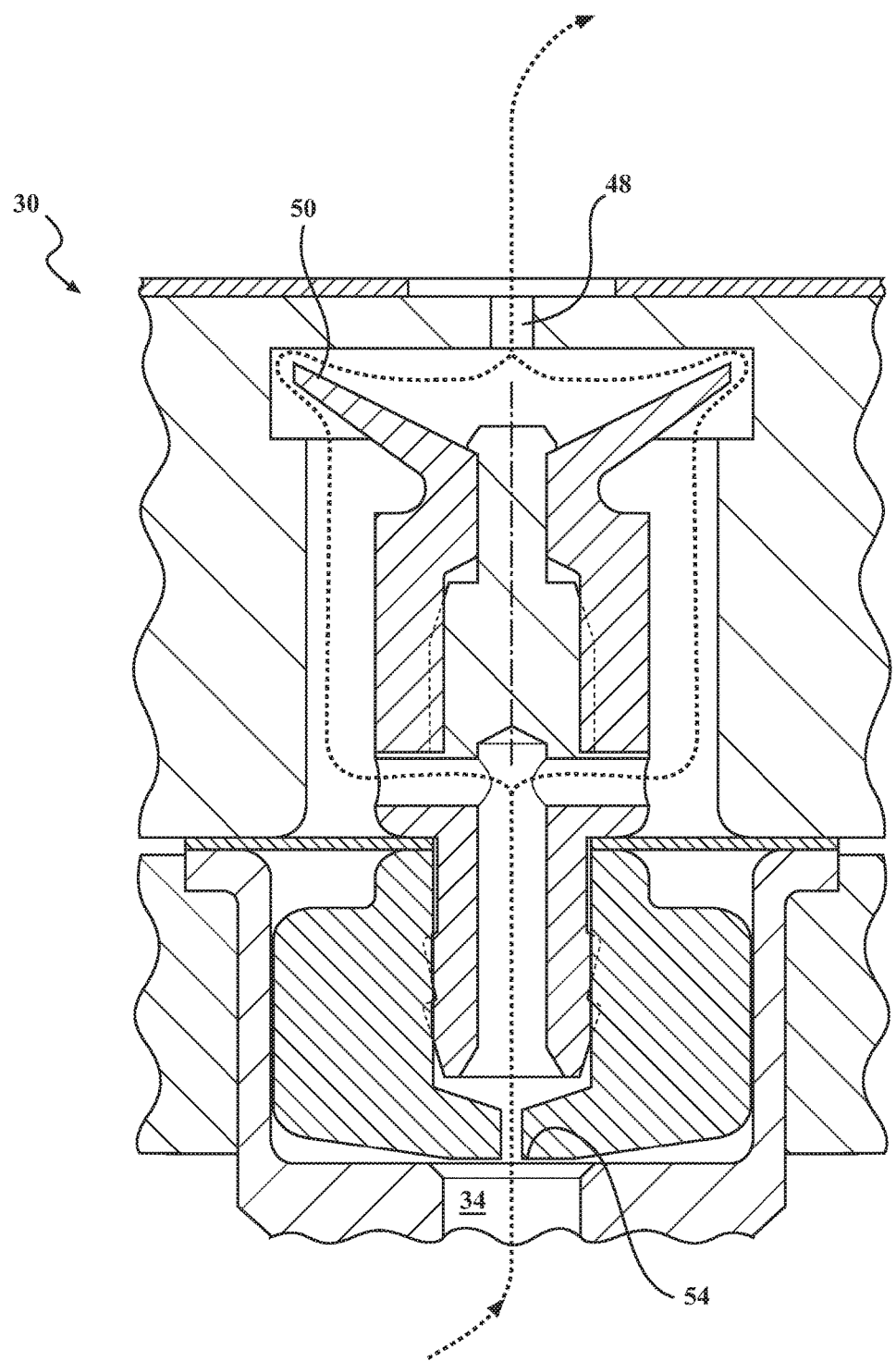
FIG. 2 is an enlarged sectional view of one of the valves of the surface vacuum gripper illustrated in FIG. 1 shown in the open position.
Figure 3:
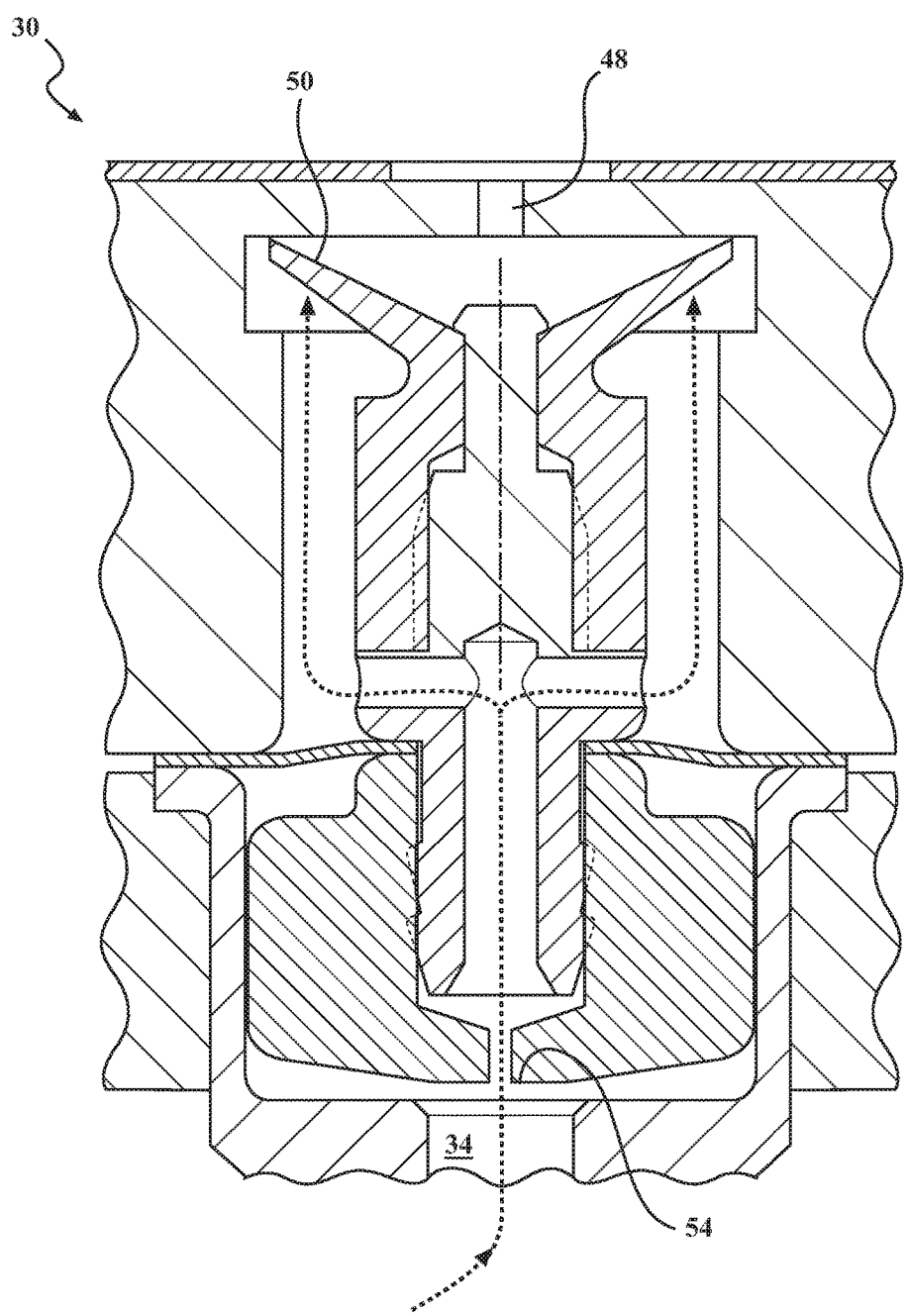
FIG. 3 is an enlarged sectional view of one of the valves of the surface vacuum gripper illustrated in FIG. 1 shown in the closed position.
Figure 4:
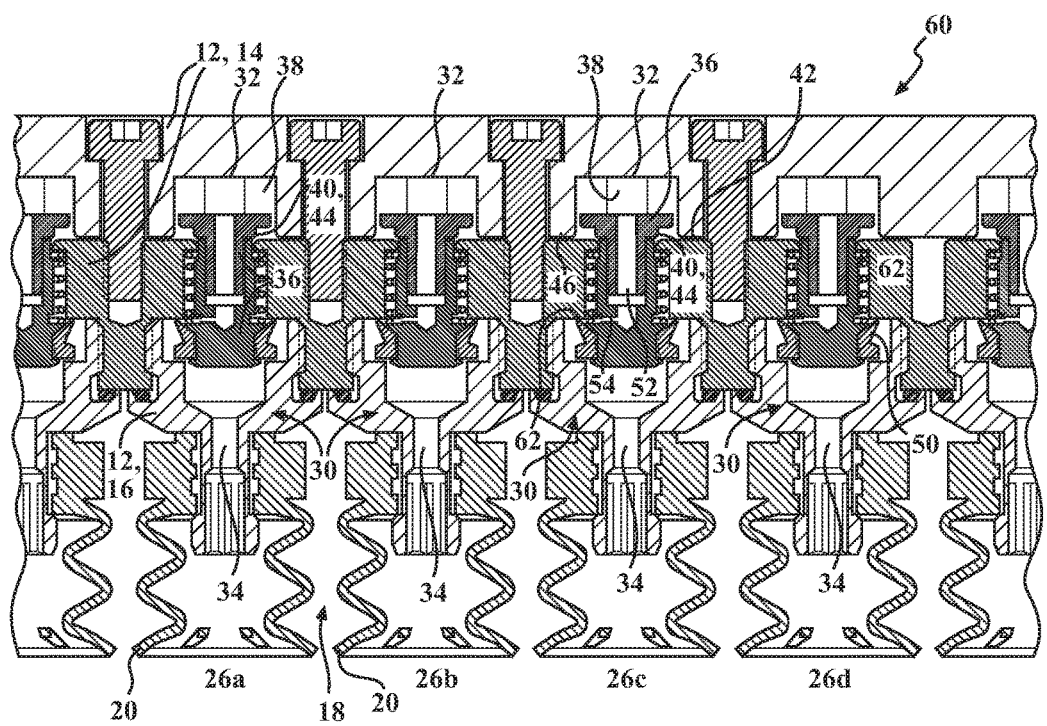
FIG. 4 is a sectional view of another embodiment of a surface vacuum gripper according to the invention.
Figure 5:
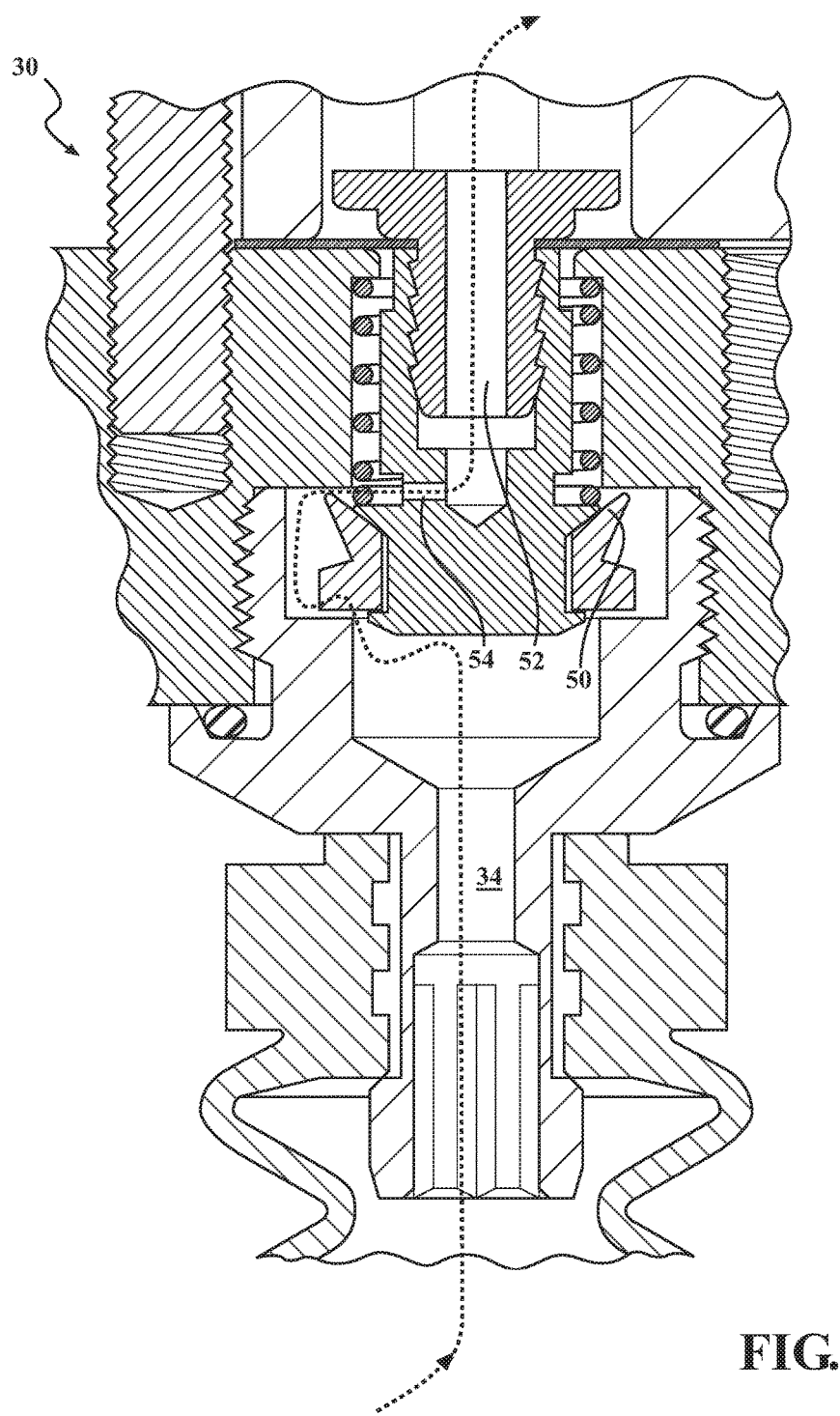
FIG. 5 is an enlarged sectional view of one of the valves of the surface vacuum gripper illustrated in FIG. 4 shown in the open position.
Figure 6:
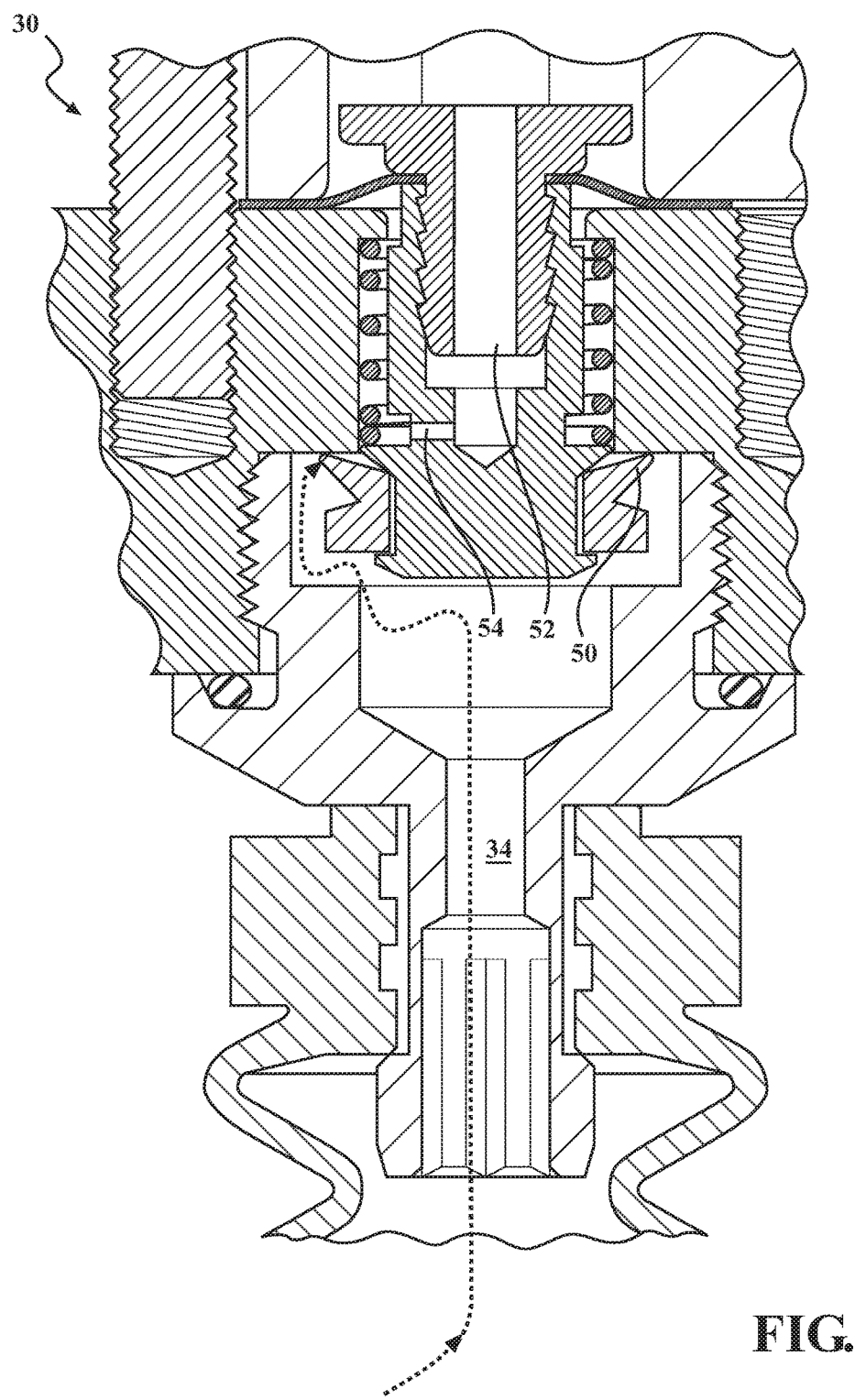
FIG. 6 is an enlarged sectional view of one of the valves of the surface vacuum gripper illustrated in FIG. 4 shown in the closed position.

The surface vacuum gripper 60 depicted in FIG. 2 differs from the surface vacuum gripper 10 substantially with regard to the design for the suction valve 30. Concerning the rest, reference is made to the description above.

The membrane sheet 42 is clamped in the surface vacuum gripper 60 between the housing upper part 14 and the housing lower part 16 of the gripper housing 12. A valve body 36 is disposed, in each case, on the control sections 44 of the membrane sheet 42, which sections form, in each case, the control membrane 40 of a suction valve 30, such that it can be displaced between an open position (depicted in FIG. 2) and a closed position. With this surface vacuum gripper 60 as well, the membrane sheet 42 delimits a respective control chamber 38 in the housing upper part 14 having the respective control section 44. With this surface vacuum gripper 60, the control chamber 38 has a flow connection to the vacuum supply side 32, which connection is independent of the position of the valve body 36.

With this surface vacuum gripper 60, the sealing section 50 is disposed outside the respective control chamber 38 at a guide section of the valve body 36 extending along a valve longitudinal direction, away from the control membrane 40. In the depicted example, the sealing section 50 is formed by a flexible sealing material, in the manner of a coil-like section encompassing the valve body. The internal space of the housing lower part accommodating the valve body 36 has a radial projection that forms a seal seat 62 for the sealing section 50. The sealing section 50 and the seal seat 62 are disposed such that, when in the closed position of the valve piston 36, the sealing section 50 bears on the seal seat 62 and as a result, a flow connection from the suction side 34 to the suction side passage 52 is interrupted. In this regard, the interruption of the flow connection already occurs here outside the control chamber 38, on the side of the control membrane 40 facing away from the control chamber 38. The control chamber 38 can be created with comparatively smaller volumes than with the surface vacuum gripper 10 as a result, wherein, depending on the design, a short response time of the suction valve 30 can be obtained.

The design with the membrane sheet 42, on which the valve bodies 36 are each disposed at the control sections 44, also enables a reliable and simple assembly with the surface vacuum gripper 60. By way of example, the membrane sheet 42 can be clamped between the housing upper part 14 and the housing lower part 16, as explained in reference to FIG. 1.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A vacuum gripping device comprising:
a plurality of suction bodies disposed adjacent to one another at suction points of a working surface of a gripper housing, each of which has a suction chamber that is to bear on a workpiece that is to be gripped,
a plurality of suction valves, wherein a suction valve is allocated to each suction body for each suction point, wherein each suction valve has a vacuum supply side that is connected to a vacuum supply device, and a suction side connected to the suction chamber of the suction body allocated thereto, wherein each of the plurality of the suction valves has a valve body that is movable between an open position and a closed position, wherein the valve body is disposed on a flexible control membrane of the respective suction valve and delimits a control chamber such that the valve body is movable from the open position to the closed position, depending on a vacuum occurring in the control chamber as a result of a deformation of the control membrane, and wherein a membrane sheet extending over most or all of the suction points is provided in the gripper housing, wherein the membrane sheet comprises a plurality of control sections, wherein each of the plurality of control membranes for most or all of the plurality of suction valves is formed by one control section, respectively, wherein the gripper housing includes a housing upper part, and a housing lower part having the working surface, wherein the membrane sheet is disposed between the housing upper part and the housing lower part.

2. The vacuum gripping device as set forth in claim 1, wherein the membrane sheet is clamped between the housing upper part and the housing lower part.

3. The vacuum gripping device as set forth in claim 1, wherein a valve accommodating chamber is formed for each suction point, extending in the gripper housing away from the working surface along a valve longitudinal direction, wherein the membrane sheet spans the valve accommodating chamber with the respective control section, in particular extending parallel to the working surface, and is secured in the valve accommodating chamber along an edge encompassing the control section.

4. The vacuum gripping device as set forth in claim 3, wherein the membrane sheet is attached at the edge, tensioned such that the valve body is pre-tensioned in the open position, against a movement into the closed position.

5. The vacuum gripping device as set forth in claim 3, wherein the valve body is disposed, spaced apart from the encompassing edge, on the control section, in particular in the center.

6. The vacuum gripping device as set forth in claim 1, wherein the valve bodies of the suction valve are each designed as an integral part of the membrane sheet.

7. The vacuum gripping device as set forth in claim 1, wherein the membrane sheet has a different thickness or a different flexibility in at least two different suction points.

8. The vacuum gripping device as set forth in claim 3, wherein at each suction point, the respective suction body is aligned with the respective valve body, which is accommodated in the respective accommodating chamber, on the side of the control membrane lying opposite the valve body.

9. The vacuum gripping device as set forth in claim 1, wherein the suction bodies of the respective suction points allocated thereto are connected to the control sections of the membrane sheet such that, when the valve body is moved from the open position to the closed position, the respective suction body is moved from an advanced suction position to a retracted passive position.

10. The vacuum gripping device as set forth in claim 1, wherein the valve body has a sealing section, which closes a suction passage when in the closed position, which connects the control chamber to the vacuum supply side, and opens the suction passage when in the open position, wherein the valve body has a suction side passage having a choke point for establishing a flow connection from the suction side to the control chamber.

11. The vacuum gripping device as set forth in claim 1, wherein the control chamber has a flow connection to vacuum supply side, and in that the valve body has a suction side passage having a choke point for establishing a flow connection of the control chamber to the suction side, and having a sealing section, which bears on a seal seat when in the closed position, wherein the sealing section and the seal seat are disposed such that the flow connection from the suction side through the suction side passage is closed in a sealed manner.

12. The vacuum gripping device as set forth in claim 1, wherein the membrane sheet has a different thickness and a different flexibility in at least two different suction points.

\* \* \* \* \*